United States Patent
Haikarainen et al.

(10) Patent No.: US 8,901,261 B2
(45) Date of Patent: Dec. 2, 2014

(54) CATALYST COMPONENT

(75) Inventors: Anssi Haikarainen, Tuusula (FI); Peter Denifl, Helsinki (FI); Timo Leinonen, Tolkkinen (FI)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 13/808,296

(22) PCT Filed: Jul. 11, 2011

(86) PCT No.: PCT/EP2011/061770
§ 371 (c)(1), (2), (4) Date: Jan. 4, 2013

(87) PCT Pub. No.: WO2012/007430
PCT Pub. Date: Jan. 19, 2012

(65) Prior Publication Data
US 2013/0116393 A1    May 9, 2013

(30) Foreign Application Priority Data
Jul. 13, 2010 (EP) .................... 10169328

(51) Int. Cl.
C08F 4/649 (2006.01)
C08F 10/00 (2006.01)

(52) U.S. Cl.
CPC ............... C08F 4/6494 (2013.01); C08F 10/00 (2013.01)
USPC .......................... 526/124.2; 502/111; 502/127

(58) Field of Classification Search
CPC .................................................... C08F 4/6494
USPC .............................. 526/124.2; 502/111, 127
See application file for complete search history.

(56) References Cited

U.S. PATENT DOCUMENTS

| 4,294,948 A | 10/1981 | Toyota et al. |
| 5,413,979 A | 5/1995 | Kostiainen et al. |
| 6,521,560 B1 | 2/2003 | Kojoh et al. |
| 2010/0113716 A1* | 5/2010 | Leinonen et al. .............. 526/65 |

FOREIGN PATENT DOCUMENTS

| CN | 1701081 A | 11/2005 |
| EP | 008307 A1 | 7/1983 |
| EP | 0083074 A1 | 7/1983 |
| EP | 0713886 A2 | 5/1996 |
| EP | 0801080 A1 | 10/1997 |
| EP | 0926165 A1 | 6/1999 |
| EP | 0949280 A1 | 10/1999 |
| EP | 1489110 A1 | 12/2002 |
| EP | 1273595 A1 | 1/2003 |
| EP | 1403292 A1 | 3/2004 |

(Continued)

OTHER PUBLICATIONS

International Search Report and Written Opinion for International Patent Application No. PCT/EP2011/061770 Filed on Nov. 7, 2011.

(Continued)

*Primary Examiner* — Ling Choi
*Assistant Examiner* — Catherine S Branch
(74) *Attorney, Agent, or Firm* — Warn Partners, P.C.

(57) ABSTRACT

The invention refers to a process for preparing a Group 2 metal/transition metal olefin polymerisation catalyst component in particulate form free of conventional phthalate electron donors and the use thereof in a process for polymerising olefins.

20 Claims, 1 Drawing Sheet

(56) References Cited

FOREIGN PATENT DOCUMENTS

| | | | |
|---|---|---|---|
| EP | 1533322 | A1 | 5/2005 |
| EP | 2206731 | A1 | 7/2010 |
| WO | 9714723 | A1 | 4/1997 |
| WO | 0008073 | A1 | 2/2000 |
| WO | 0008074 | A1 | 2/2000 |
| WO | 0155230 | A1 | 8/2001 |
| WO | 03000754 | A1 | 1/2003 |
| WO | 03000757 | A1 | 1/2003 |
| WO | 2004029112 | A1 | 4/2004 |
| WO | 2009057747 | A1 | 5/2009 |

OTHER PUBLICATIONS

European Search Report EP 2,570,438 A3, Mailed Nov. 19, 2013.

Römpps Chemie-Lexicon, 7. Edition, Franckh'sche Verlagshandlung, W.Keller & Co. Stuttgart, 1973, p. 1831.

* cited by examiner

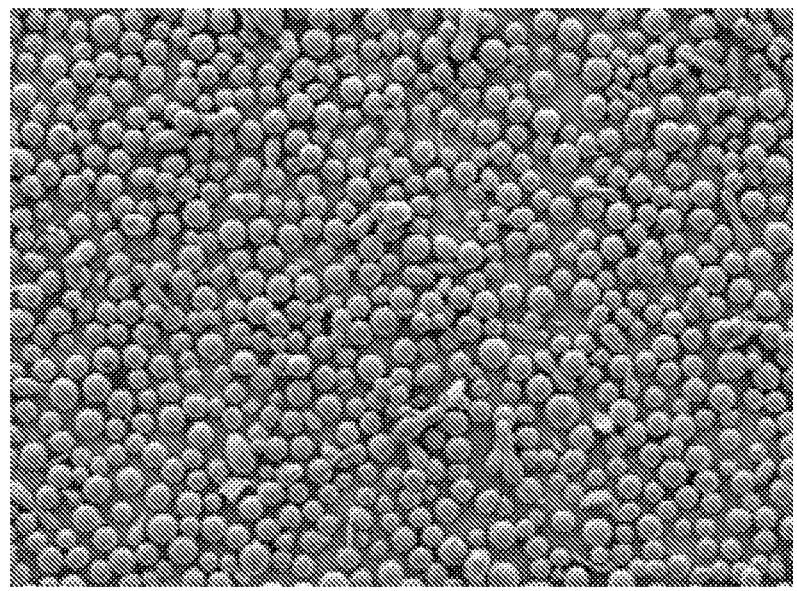

CATALYST COMPONENT

CROSS REFERENCE TO RELATED APPLICATIONS

This application is a National Stage of International Application No. PCT/EP2011/061770, filed Jul. 11, 2011. This application claims priority to European Patent Application No. 10169328.1 filed on Jul. 13, 2010. The disclosures of the above applications are incorporated herein by reference.

The invention relates to a particulate olefin polymerisation catalyst component, particularly one comprising a Group 2 metal and to a process for preparing same. The invention also relates to the use of such a catalyst component for preparing a catalyst used in the polymerisation of olefins.

BACKGROUND OF THE INVENTION

Ziegler-Natta (ZN) type polyolefin catalysts are well known in the field of polymers, generally, they comprise (a) at least a catalyst component formed from a transition metal compound of Group 4 to 6 of the Periodic Table (IUPAC, Nomenclature of Inorganic Chemistry, 1989), a metal compound of Group 1 to 3 of the Periodic Table (IUPAC), and, optionally, a compound of group 13 of the Periodic Table (IUPAC) and/or an internal donor compound. ZN catalyst may also comprise (b) further catalyst component(s), such as a cocatalyst and/or an external donor.

Various methods for preparing ZN catalysts are known in the state of art. In one known method, a supported ZN catalyst system is prepared by impregnating the catalyst components on a particulate support material. In WO-A-01 55 230, the catalyst component(s) are supported on a porous, inorganic or organic particulate carrier material, such as silica.

In a further well known method the carrier material is based on one of the catalyst components, e.g. on a magnesium compound, such as $MgCl_2$. This type of carrier material can also be formed in various ways. EP-A-713 886 of Japan Olefins describes the formation of $MgCl_2$ adduct with an alcohol which is then emulsified and finally the resultant mixture is quenched to cause the solidification of the droplets.

Alternatively, EP-A-856 013 of BP discloses the formation of a solid Mg-based carrier, wherein the Mg-component containing phase is dispersed to a continuous phase and the dispersed Mg-phase is solidified by adding the two-phase mixture to a liquid hydrocarbon.

The formed solid carrier particles are normally treated with a transition metal compound and optionally with other compounds for forming the active catalyst.

Accordingly, in case of external carriers, some examples of which are disclosed above, the morphology of the carrier is one of the defining factors for the morphology of the final catalyst.

One disadvantage encountered with the supported catalyst systems is that distribution of the catalytically active compounds on the support material is dependent on the surface chemistry and the surface structure of the support material. As a result this may often lead to non-uniform distribution of the active component(s) within the catalyst particle. As a consequence of the uneven distribution of the active sites in catalyst particles catalysts with intra-particle in-homogeneities, as well inter-particle in-homogeneities between separate particles are obtained, which leads finally to in-homogeneous polymer material.

Further, support material will remain in the final polymer as a residue, which might be harmful in some polymer applications.

WO-A-00 08073 and WO-A-00 08074 describe further methods for producing a solid ZN-catalyst, wherein a solution of an Mg-based compound and one or more further catalyst compounds are formed and the reaction product thereof is precipitated out of the solution by heating the system. Furthermore, EP-A-926 165 discloses another precipitating method, wherein a mixture of $MgCl_2$ and Mg-alkoxide is precipitated together with a Ti-compound to give a ZN catalyst.

EP-A-83 074 and EP-A-83 073 of Montedison disclose methods for producing a ZN catalyst or a precursor thereof, wherein an emulsion or dispersion of Mg and/or Ti compound is formed in an inert liquid medium or inert gas phase and said system is reacted with an Al-alkyl compound to precipitate a solid catalyst. According to examples said emulsion is then added to a larger volume of Al-compound in hexane and prepolymerised to cause the precipitation.

In general, a drawback of such precipitation methods is the difficulty to control the precipitation step and thus the morphology of the precipitating catalyst particles. Furthermore, the precipitation of the catalyst component(s) results easily in formation of broad particle size distribution of catalyst particles comprising particles from very small particles to big agglomerates, and further to the loss of the morphology of the catalyst and formation of fines. In polymerisation process this causes in turn undesired and harmful disturbances, like plugging, formation of polymer layer on the walls of the reactor and in lines and in further equipments, like extruders, as well decreased flowability of polymer powder and other polymer handling problems.

WO 03/000757 as well WO 03/000754 describe a process for the preparation of an olefin polymerisation catalyst component, enabling to prepare solid particles of a catalyst component comprising a group 2 metal together with a transition metal however without using any external carrier material or without using conventional precipitation methods, but using so called emulsification-solidification method for producing solid catalyst particles. In this process a phthalate type internal electron donor is prepared in situ during the catalyst preparation in a way and using chemicals so that a stable emulsion is formed. Droplets of the dispersed phase of the emulsion form the catalyst component, and solidifying the droplets results in solid particulate catalyst.

WO 2004/029112 discloses a further modification of the basic emulsion-solidification method as described in WO 03/000757 as well WO 03/000754, and relates thus to process for preparing an olefin polymerisation catalyst component, wherein the process is further characterized in that a specific aluminum alkyl compound is brought into contact with the catalyst component, enabling a certain degree of activity increase at higher temperatures.

U.S. Pat. No. 5,413,979 describe a further method for the preparation of a solid procatalyst composition wherein support materials are impregnated with catalyst component precursors in order to obtain a catalyst component.

U.S. Pat. No. 4,294,948 finally discloses a process for preparing an olefin polymer or copolymer, employing a solid titanium catalyst component prepared by treating pulverized catalyst precursors with organo metallic compounds of a metal of any of groups I or III of the Periodic Table, characterized in that the catalyst preparation occurs using pulverized, solid and particulate precursor materials.

EP 1403292 A1, EP 0949280 A1, U.S. Pat. Nos. 4,294,948, 5,413,979, and 5,409,875 as well as EP 1273595 A1 describe processes for the preparation of olefin polymerisation catalyst components or olefin polymerisation catalysts as well as processes for preparing olefin polymers or copolymers.

Accordingly, although much development work has been done in the field of Ziegler-Natta catalysts, there remains a need for alternative or improved methods of producing ZN catalysts with desirable properties. One particular aspect in this connection is the desire to avoid as far as possible the use of substances which are considered as potential harmful compounds regarding health as well as environmental aspects. One class of substances which have been considered as potential harmful compounds is phthalates, which have been commonly used as internal electron donors in Ziegler-Natta type catalysts. Although the amount of these phthalate compounds, used as internal donors in catalysts, in the final polymer is very small, it is still desirable to find out alternative compounds to replace phthalate compounds and still get catalysts having good activity, excellent morphology and other desired properties.

Use of non-phthalate donors is as such not new in ZN catalysts. However, such donors are used in catalysts, which are prepared by precipitation method (as in WO2009/057747 or U.S. Pat. No. 6,521,560) or supporting the catalyst components on an external carrier. Drawbacks of such catalysts are described above.

The above-outlined prior art procedures, in particular the processes for preparing olefin polymerisation catalyst components as outlined in WO 03/000757 (emulsion (liquid/liquid two-phase system)-solidification method) typically comprise bis(2-ethyl-hexyl)phthalate (often called dioctylphthalate, DOP) as internal donor. The process for preparing such catalyst components involves the preparation of the donor in situ by reacting a precursor of this internal donor, typically phthaloyldichloride (PDC), with an alcohol, typically 2-ethyl-hexanol, which has been essential in forming the stable liquid-liquid-two phase system and results in excellent morphology and desired mean particle size of the catalyst and in addition activity on a desired level.

Accordingly, it would be highly advantageous if processes for preparing olefin polymerisation catalyst components would be available which allow the formation of catalyst components via the liquid-liquid two-phase system as for example outlined in WO 03/000757, however without the need of using non-desired phthalate compounds in catalyst preparation, and still get the excellent properties obtainable by the emulsion-solidification method. Until now it has not been possible, i.e. it has not been possible to form a stable emulsion just by changing a donor or donor precursor, due to the very sensitive nature of emulsion formation in this catalyst preparation method.

It is of particular interest to obtain a catalyst in particulate form which results in good and desired polymer properties, which catalysts and further polymers are free of such undesired substances, especially phthalate compounds or their derivatives. Accordingly it is one object of the present invention to provide a method for preparing catalyst components which do not require the use of phthalates as internal electron donor and still without sacrificing the desired and advantageous properties of the known catalyst components. Further, it is an object of the invention to provide a catalyst as herein described for use in olefin polymerisation.

DESCRIPTION OF THE INVENTION

Accordingly the present invention provides the process for preparing a catalyst component as defined in claim 1. Preferred embodiments are described in dependent claims as well in the following description. Further, the present invention provides the catalyst components obtainable in accordance with the present invention and further use of the catalyst in the olefin polymerisation.

The invention will be described in the following in greater detail, referring to the particular preferred embodiments. Essential in all embodiments is that solid catalyst can be prepared via stable liquid/liquid two-phase (emulsion) system—solidification method without the need of using phthalate compounds leading to catalyst particles having beneficial properties, e.g. especially good morphological properties. Good morphological properties have been obtained for catalysts prepared by emulsion-solidification method in general earlier as well, but only with restricted selection of chemicals, leading to a much narrower operating window as regards to other catalyst properties.

It has been surprisingly found by the inventors of the present invention that catalyst component particles having in embodiments good morphology (spherical shape of particles, having smooth surface and non-porous structure as well narrow particle size distribution) can be obtained by the emulsion-solidification way of preparing Ziegler-Natta (ZN) type catalysts, for use in olefin polymerisation, in particular for propylene polymerisation, identified in the prior art cited above, but not requiring the use of phthalates. According to the replica effect, the polymer particles produced by using the inventive catalyst have very good morphological properties, too. The inventive catalyst preparation is based on a liquid/liquid two-phase system where no separate external carrier materials such as silica or $MgCl_2$ are needed in order to get solid catalyst particles.

As indicated in claim 1, this process for preparing a solid catalyst particles is in particular characterized in that the formation of the catalyst component comprises use of at least one complex of Group 2 metal (Complex A) being a complex of at least a compound of Group 2 metal and an alcohol comprising in addition to the hydroxyl moiety at least one further oxygen bearing group being different to a hydroxyl moiety, as defined below (alcohol A), and further characterized that non-phthalic acid ester as internal electron donor is used in the catalyst preparation as such or formed in situ. Preferably the Group 2 complex is a reaction product of a compound of Group 2 metal, as described further below, and said alcohol A. Typically, such further oxygen bearing group is an ether moiety. The alcohol A as defined above may be aliphatic or aromatic although aliphatic compounds are preferred. The aliphatic compounds may be linear, branched or cyclic or any combination thereof and in particular preferred alcohols are those comprising one ether moiety.

According to one embodiment during formation of the catalyst component, only one type of Group 2 metal complex, as defined above, is used.

According to another embodiment in addition to the at least one Complex A as defined above it is possible to use at least one additional complex of Group 2 metal (Complex B) being a complex of a compound of Group 2 metal and an alcohol not comprising any other oxygen bearing group being different to a hydroxyl moiety (alcohol B).

Complexes of Group 2 metal (Complexes A and B) can be prepared in situ in the first step of the catalyst preparation process by reacting said compounds of Group 2 metal with the alcohol as described above, or said complexes can be separately prepared complexes, or they can be even commercially available as ready complexes and used as such in the catalyst preparation process of the invention.

During preparation of the complex A or B from the compound of Group 2 metal and the alcohol as defined above, a donor or a donor precursor can be added into the reaction mixture, whereby the Group 2 metal complex (Complex A or B) can be defined in this application to be a complex of the Group 2 metal compound, the alcohol and a donor. If complex A or B is formed without using any donor(s) or donor precursor(s), donor(s) is added separately to the Group 2 metal complex solution or during preparation of the catalyst component. Thus, the Group 2 metal complex is to be understood to be either a complex of a compound of Group 2 metal and an alcohol, or a complex of a compound of group 2 metal, alcohol and donor or donor precursor, depending on the step, where the donor or donor precursor is added to the reaction system.

Illustrative examples of such preferred alcohols A comprising in addition to the hydroxyl moiety at least one further oxygen bearing group to be employed in accordance with the present invention are glycol monoethers, in particular $C_2$ to $C_4$ glycol monoethers, such as ethylene or propylene glycol monoethers wherein the ether moieties comprise from 2 to 18 carbon atoms, preferably from 4 to 12 carbon atoms. Preferred monoethers are $C_2$ to $C_4$ glycol monoethers and derivatives thereof. Illustrative and preferred examples are 2-(2-ethylhexyloxy)ethanol, 2-butyloxy ethanol, 2-hexyloxy ethanol and 1,3-propylene-glycol-monobutyl ether, with 2-(2-ethylhexyloxy)ethanol and 1,3-propylene-glycol-monobutyl ether, being particularly preferred.

The use of the specific complexes of Group 2 metal, as defined above (Complexes A), enables the formation of the liquid/liquid two-phase system required for the preparation of the desired solid catalyst component particles, which has not been possible earlier. This is a novel and surprising finding, which allows preparation of catalysts allowing addition of donors as such or prepared in situ from chemicals the use of which has not been possible earlier to the system without sacrificing the stable liquid/liquid two-phase system. Now, according to the present invention an improved preparation method is provided, which allows formation of the stable liquid/liquid two-phase system and using donors, which has not been possible to use earlier, especially using non-phthalic donors, like non-phthalates.

Formation of a stable emulsion, where catalyst components are within the droplets of the dispersed phase of the emulsion is a very sensitive process towards the chemicals used, wherefore until now the emulsion has been formed only with the method using chemicals as described in the prior art. Although the method of prior art allows formation of satisfactory emulsion, it does not allow to change of donors, wherefore the properties of the catalyst obtained are restricted to those obtainable with the chemicals (donors) used until now.

This method of the present invention gives further possibilities to change the donor type and to adjust the donor concentrations, which allows preparation of catalysts and further polymers with desired properties.

In a preferred embodiment the catalyst component according to the first embodiment of the present invention may be prepared as follows:
a) providing a solution of at least one complex of Group 2 metal (Complex A) optionally in an organic liquid reaction medium
b) adding said solution to at least one compound of a transition metal and producing an emulsion the dispersed phase of which contains more than 50-mol % of the Group 2 metal;
c) agitating the emulsion in order to maintain the droplets of said dispersed phase preferably within an average size range of 5 to 200 μm;
d) solidifying said droplets of the dispersed phase;
e) recovering the solidified particles of the olefin polymerisation catalyst component, wherein the electron donor is added at any step prior to step c) and is non-phthalic acid ester.

In step a) the solution is typically a solution of Complex A in liquid hydrocarbon reaction medium, or is provided in situ by reacting an alcohol as defined above (alcohol A) with a Group 2 metal compound, such as a magnesium compound, preferably a magnesium compound described further below, in a liquid hydrocarbon reaction medium. The internal donor or precursor thereof as defined further below is added preferably in step a) to said solution. The solution of step a) is then typically added to the at least one compound of a transition metal, such as titanium tetrachloride. This addition preferably is carried out at a low temperature, such as from −10 to 40° C., preferably from −5 to 30° C., such as about 0° C. to 25° C.

During any of these steps an organic reaction medium or solvent may be present, typically selected among aromatic and/or aliphatic hydrocarbons, as further outlined below.

Additional donors can be added, if so desired into the catalyst preparation in any of steps before step e). Preferably additional donors, if used, are non-phthalic acid ester as well.

In a second preferred embodiment, the present invention provides a process for preparing an olefin polymerisation catalyst component as described above, however, wherein a combination of complexes of Group 2 metal, i.e. Complexes A and B as defined above, are used in the preparation of the catalyst component of the invention. Complexes A and B can be ready made, e.g. commercially available complexes or prepared separately or prepared in situ as described above by reacting compounds of Group 2 metal with alcohol A and B, respectively and optionally donor or donor precursor Alcohol B is preferably an aliphatic monohydric alcohol, as further described below.

Thus, in a preferred embodiment the catalyst component according to the second embodiment of the present invention may be prepared as follows:
f) providing a solution of a mixture of at least one complex of Group 2 metal (Complex A) and at least one additional complex of Group 2 metal (Complex B) optionally in an organic liquid reaction medium,
g) adding said solution to at least one compound of a transition metal and producing an emulsion the dispersed phase of which contains more than 50-mol % of the Group 2 metal;
h) agitating the emulsion in order to maintain the droplets of said dispersed phase preferably within an average size range of 5 to 200 μm;
i) solidifying said droplets of the dispersed phase;
j) recovering the solidified particles of the olefin polymerisation catalyst component,
wherein the electron donor or precursor thereof is added at any step prior to step h) and is non-phtalic acid ester.

The solution of step f) is then typically added to the at least one compound of a transition metal, such as titanium tetrachloride. This addition preferably is carried out at a low temperature, such as from −10 to 40° C., preferably from −5 to 20° C., such as about −5° C. to 15° C.

Preferably the donor is added to the solution provided in step f).

Additional donors can be added, if so desired into the catalyst preparation in any of steps before step j). Preferably additional donors, if used, are non-phthalic acid ester as well.

It has been found that the use of such a combination of complexes, or in case of in situ preparation of the complexes a combination of alcohols, as defined above, enables the preparation of olefin polymerisation catalyst components using the liquid-liquid two-phase system with a greater latitude with respect to process conditions and starting components and reactants employed and leading to such catalyst components is a stable and highly reproducible reaction showing greater tolerance towards variations in reaction conditions, and further limits the occurrence of undesired gelation and/or precipitation.

In case a mixture of Complexes A and B (or alcohols A and B respectively) are used, y the different complexes or alcohols are usually employed in a mole ratio of from 10:1 to 1:10, preferably this mole ratio is from 5:1 to 1:5, more preferably 4:1 to 1:4, even more preferably 3:1 to 1:3 and in embodiments also 2:1 to 1:2. This ratio can be adjusted depending e.g. on the desired polymer properties.

The emulsion, i.e. the two phase liquid-liquid system may be formed in all embodiments of the present invention by simple stirring and optionally adding (further) solvent(s) and additives, such as the turbulence minimizing agent (TMA) and/or the emulsifying agents described further below.

The solvents to be employed for the preparation of the catalyst component as described above may be selected among aromatic and aliphatic solvents or mixtures thereof. Preferably the solvents are aromatic and/or aliphatic hydrocarbons with 5 to 20 carbon atoms, preferably 5 to 16, more preferably 5 to 12 carbon atoms, examples of which include benzene, toluene, cumene, xylol and the like, with toluene being preferred, as well as pentane, hexane, heptane, including straight chain, branched and cyclic compounds, and the like, with heptanes or nonane being particular preferred.

In embodiments it is preferred to use a mixture of aromatic and aliphatic solvents, with volume ratios (aromatic:aliphatic) of the solvents from 10:1 to 1:10, preferably 5:1 to 1:5, like 2:1 to 1:2, and in some embodiments about 1:1. A preferred example thereof is a mixture of toluene and heptane. The temperature for steps b) and c), and g) and h) is typically as described for step a) and f), while solidification typically requires heating as described in detail further below.

Typically the molar ratio of the aromatic solvent, preferably toluene, to the group 2 metal, preferably magnesium, is 10 or less, such as from 4 to 10, and in embodiments from 5 to 9.

Concerning preferred embodiments of this process regarding temperatures, means for forming the emulsion, addition of additives etc. reference is made to the description of the above, as well as to the following specification. Non-phthalic acid ester electron donors to be used in the preparation of the present invention are those described in greater detail below.

The present invention further provides a catalyst component obtainable by the method as defined herein as well as a polymerisation catalyst obtained using the catalyst component of the present invention.

The present invention, with respect to the above-identified main embodiments, will be explained further in detail below. In this respect, it has to be emphasized that the present invention also contemplates any combination of any of the embodiments as outlined above and that furthermore all preferred embodiments, as far as applicable, outlined below apply to all the embodiments identified above, alone or in any combination.

It has been surprisingly found by the inventors of the present invention that catalyst component particles having a good morphology, size and uniform particle size distribution can be obtained by the inventive way of preparing Ziegler-Natta (ZN) type catalysts, for use in olefin polymerisation, like ethylene or propylene, in particular for propylene polymerisation, optionally with other co-monomers selected from $C_2$-$C_{12}$ monomers, preferably $C_2$-$C_6$ monomers as described herein. The produced catalyst components according to the invention have excellent morphology, good particle size distribution and result in polymerisation catalysts having highly suitable polymerisation activities. According to the replica effect, the polymer particles produced by using the inventive catalyst components have very good morphological properties, too. The inventive catalyst component preparation is based on a liquid/liquid two-phase system where no separate external carrier materials such as silica or $MgCl_2$ are needed in order to get solid catalyst particles.

As far as in the following specification and claims, the polymerisation catalyst component is described by referring to a predetermined size range, this size range refers to the particle diameter, since the catalyst component particles as obtained in accordance with the present invention are almost perfect spheres for which the particle shape can be observed by microscopic techniques or the particle size distribution and the particle size range can be determined by using a Coulter Counter LS200 at room temperature (20° C.) with n-heptane as medium. Typical mean particle sizes are from 5 to 500 µm, such as from 5 to 300 µm and in embodiments from 5 to 200 µm, or even from 10 to 100 µm. These ranges also apply for the droplets of the dispersed phase of the emulsion as described herein, taking into consideration that the droplet size can change (decrease) during the solidification step.

Polymerisation processes, where the catalyst components of the invention are useful comprise at least one polymerisation stage, where polymerization is typically carried out in solution, slurry, bulk or gas phase Typically, the polymerisation process comprises additional polymerisation stages or reactors. In one particular embodiment the process contains at least one bulk reactor zone and at least one gas phase reactor zone, each zone comprising at least one reactor and all reactors being arranged in cascade. In one particularly preferred embodiment the polymerisation process for polymerising olefins, in particular propylene optionally with comonomers, like ethylene or other α-olefins, comprises at least one bulk reactor and at least one gas phase reactor arranged in that order. In some preferred processes the process comprises one bulk reactor and at least two, e.g. two or three gas phase reactors. The process may further comprise pre- and post reactors. Prereactors comprise typically prepolymerisation reactors. In these kinds of processes use of higher polymerisation temperature (70° C. or higher, preferably 80° C. or higher, even 85° C. or higher) either in some or all reactors of the reactor cascade, is preferred in order to achieve some specific properties to the polymers.

The new inventive method can be easily scaled up in order to avoid common up-scaling problems in the prior art which led to unsatisfied catalyst morphology and particle size distribution as well as reduced activity at higher temperature.

The compound of Group 2 metal used in the inventive process according to all embodiments of the present invention is preferably a compound of magnesium, most preferably a $C_1$ to $C_{20}$ alkyl magnesium compound.

The reaction for the preparation of the complex of Group 2 metal may in embodiments, be carried out at a temperature of 20° to 80° C., and in case that the Group 2 metal is magnesium, the preparation of the magnesium complex may be carried out at a temperature of 50° to 70° C.

An electron donor compound used in the preparation of the catalyst of the present invention is preferably selected from diesters of non-phthalic carboxylic diacids and esters of carboxylic monoacids and derivatives and mixtures thereof. The ester moieties, i.e. the moieties derived from an alcohol (i.e. the alkoxy group of the ester), may be identical or different, preferably these ester moieties are identical. Typically the ester moieties are aliphatic or aromatic hydrocarbon groups. Preferred examples thereof are linear or branched aliphatic groups having from 1 to 20 carbon atoms, preferably 2 to 16 carbon atoms, more preferably from 2 to 12 carbon atoms, or aromatic groups having 6 to 12 carbon atoms, optionally containing heteroatoms of Groups 14 to 17 of the Periodic Table of IUPAC, especially N, O, S and/or P. The acid moiety of the di- or monoacid (di)ester preferably comprises 1 to 30 carbon atoms, more preferably, 2 to 20 carbon atoms, still more preferably 2 to 16 carbon atoms, optionally being substituted by aromatic or saturated or non-saturated cyclic or aliphatic hydrocarbyls having 1 to 20 C, preferably 1 to 10 carbon atoms and optionally containing heteroatoms of Groups 14 to 17 of the Periodic Table of IUPAC, especially N, O, S and/or P.

In particular preferred esters are esters belonging to a group comprising malonates, maleates, succinates, glutarates, cyclohexene-1,2-dicarboxylates and benzoates, optionally being substituted as defined below, and any derivatives and/or mixtures thereof. Examples of e.g. substituted maleates are citraconates. Within the preferred group of electron donors of the present invention are diesters of non-phthalic carboxylic diacids, optionally being substituted by aliphatic hydrocarbyls having 1 to 20 C, preferably 1 to 10 C atoms. Suitable examples of such diesters are e.g. malonates, maleates, succinates, glutarates, cyclohexene-1,2-dicarboxylates. Especially preferred diesters are mono-unsaturated dicarboxylic acids.

Preparation of esters used as donors can be prepared as is well known in the art. As example dicarboxylic acid diesters can be formed by simply reacting of a carboxylic diacid anhydride with a $C_1$-$C_{20}$ alkanol and/or diol.

The compound of a transition metal employed in the present invention is selected from Group 4 metal, Group 5 metal, Group 6 metal, or from Cu, Fe, Co, Ni and/or Pd compounds. Preferably a compound of a Group 4 or Group 5 metals, particularly V metal is used. Most preferably Group 4 metal is used, and especially preferably titanium, and its compound, especially halide, like $TiCl_4$ is to be reacted with the complex of a Group 2

In a further embodiment of the invention, a compound of a transition metal used in the process can also contain organic ligands typically used in the field known as a single site catalyst.

The process in accordance with the present invention yields as intermediate stage, as identified above an emulsion of a denser, transition metal compound/toluene-insoluble, oil dispersed phase typically having a transition metal metal/Group 2 mol ratio of 0.1 to 10 in an oil disperse phase having a transition metal/Group 2 mol ratio of 10 to 100. Transition metal compound is preferably Group 4 metal compound, and is most preferably $TiCl_4$. Group 2 metal is preferably Mg. This emulsion is then typically agitated, optionally in the presence of an emulsion stabilizer and/or a turbulence minimizing agent, in order to maintain the droplets of said dispersed phase, typically within an average size range of 5 to 200 μm. The catalyst particles are obtained after solidifying said particles of the dispersed phase e.g. by heating.

The said disperse and dispersed phases are thus distinguishable from one another by the fact that the denser oil, if contacted with a solution of Group 4 metal compound preferably $TiCl_4$ in toluene, will not dissolve in it. A suitable solution for establishing this criterion would be one having a toluene mol ratio of 0.1 to 0.3. They are also distinguishable by the fact that the great preponderance of the Mg provided (as complex) for the reaction with the Group 4 metal compound is present in the dispersed phase, as revealed by comparison of the respective Group 4 metal/Mg mol ratios.

In effect, therefore, virtually the entirety of the reaction product of the Mg complex with the Group 4 metal—which is the precursor of the ultimate catalyst component—becomes the dispersed phase, and proceeds through the further processing steps to the final particulate form. The disperse phase, still containing a useful quantity of Group 4 metal, can be reprocessed for recovery of that metal.

The production of a two-phase reaction product is encouraged by carrying out the Mg complex/Group 4 metal compound reaction at low temperature, specifically above −10° C. but below 60° C., preferably between above −5° C. and below 50° C. Since the two phases will naturally tend to separate into a lower, denser phase and supernatant lighter phase, it is necessary to maintain the reaction product as an emulsion by agitation, preferably in the presence of an emulsion stabilizer.

The resulting particles from the dispersed phase of the emulsion are of a size, morphology (spherical shape) and uniformity which render the ultimate catalyst component extremely effective in olefin polymerisation. This morphology is preserved during the heating to solidify the particles, although certain shrinkage may be observed, and of course throughout the final washing and optional drying steps. It is, by contrast, difficult to the point of impossibility to achieve such morphology through precipitation, because of the fundamental uncontrollability of nucleation and growth, and the large number of variables which affect these events.

Furthermore, emulsifying agents/emulsion stabilizers can be used additionally in a manner known in the art for facilitating the formation and/or stability of the emulsion. For the said purposes e.g. surfactants, e.g. a class based on acrylic or methacrylic polymers can be used. Preferably, said emulsion stabilizers are acrylic or methacrylic polymers, in particular those with medium sized ester side chains having more than 10, preferably more than 12 carbon atoms and preferably less than 30, and preferably 12 to 20 carbon atoms in the ester side chain. Particular preferred are unbranched $C_{12}$ to $C_{20}$ (meth)acrylates such as poly(hexadecyl)-methacrylate and poly(octadecyl)-methacrylate.

Furthermore, in some embodiments a turbulence minimizing agent (TMA) can be added to the reaction mixture in order to improve the emulsion formation and maintain the emulsion structure. Said TMA agent has to be inert and soluble in the reaction mixture under the reaction conditions, which means that polymers without polar groups are preferred, like polymers having linear or branched aliphatic carbon backbone chains. Said TMA is in particular preferably selected from α-olefin polymers of α-olefin monomers with 6 to 20 carbon atoms, like polyoctene, polynonene, polydecene, polyundecene or polydodecene or mixtures thereof. Most preferable it is polydecene.

TMA can be added to the emulsion in an amount of e.g. 1 to 1.000 ppm, preferably 5 to 100 ppm and more preferable 5 to 50 ppm, based on the total weight of the reaction mixture.

It has been found that the best results are obtained when the Group 4 metal/Mg mol ratio of the denser oil is 1 to 5, preferably 2 to 4, and that of the disperse phase oil is 55 to 65. Generally the ratio of the mol ratio Group 4 metal/Mg in the disperse phase oil to that in the denser oil is at least 10.

Solidification of the dispersed phase droplets by heating is suitably carried out at a temperature of 70 to 150° C., usually at 80 to 110° C., preferably at 90 to 110° C. The heating may be done faster or slower. As especial slow heating is understood here heating with a heating rate of about 5° C./min or less, and especial fast heating e.g. 10° C./min or more. Often slower heating rates are preferable for obtaining good morphology of the catalyst component.

The solidified particulate product may be washed at least once, preferably at least twice, most preferably at least three times with a hydrocarbon, which preferably is selected from aromatic and aliphatic hydrocarbons, preferably with toluene, heptane or pentane, which might include a smaller or higher amount of $TiCl_4$ in it. The amount of $TiCl_4$ can vary from a few vol % to more than 50-vol %, such as from 5-vol % to 50-vol %, preferably from 5 to 15-vol %. It is also possible that at least one wash is done with 100-vol % $TiCl_4$. Washings can be done with hot (e.g. 90° C.) or cold (room temperature) hydrocarbons or combinations thereof. In addition aluminum alkyl, like alkyl aluminium halide, or aluminium alkoxy compound, optionally containing alkyl and/or halide groups can be used in the catalyst component preparation of the invention. Said Al-compound can be added at any step of the preparation before the final recover. One preferred step is to add it during the washing step.

Finally, the washed catalyst component is recovered. It can further be dried, as by evaporation or flushing with nitrogen, or it can be slurried to an oily liquid without any drying step.

The finally obtained catalyst component is desirably in the form of particles having generally an average size range of 5 to 200 μm, preferably 10 to 100, even an average size range of 20 to 60 μm is possible. Catalysts prepared according to the method of the present invention have a high bulk density and morphology, which correlate with polymer product bulk density and good morphology according to the so-called "replication effect".

The present invention further comprehends an olefin polymerisation catalyst comprising a catalyst component prepared as aforesaid, for example in association with an alkyl aluminum cocatalyst and optionally external donors, and the use of that polymerisation catalyst for the polymerisation of $C_2$ to $C_{10}$-olefins.

The technique adopted in the novel regimen of the invention is inherently more precise than that formerly employed.

It is preferable that the intermediates as well as the final product of the process be distinct compounds with an essentially stoichiometric composition. Often, they are complexes. A complex is, according to Römpps Chemie-Lexicon, 7. Edition, Franckh'sche Verlagshandlung, W. Keller & Co., Stuttgart, 1973, page 1831, "a derived name of compounds of higher order, which originate from the combination of molecules,—unlike compounds of first order, in the creation of which atoms participate".

The magnesium complexes can be alkoxy magnesium complexes, preferably selected from the group consisting of magnesium dialkoxides, complexes of a magnesium dihalide and an alcohol, and complexes of a magnesium dihalide and a magnesium dialkoxide. It may be a reaction product of an alcohol and a magnesium compound selected from the group consisting of dialkyl magnesiums, alkyl magnesium alkoxides, alkyl magnesium halides and magnesium dihalides, preferably dialkyl magnesium. It can further be selected from the group consisting of dialkyloxy magnesiums, diaryloxy magnesiums, alkyloxy magnesium halides, aryloxy magnesium halides, alkyl magnesium alkoxides, aryl magnesium alkoxides and alkyl magnesium aryloxides.

The magnesium dialkoxide may be the reaction product of a magnesium dihalide such as magnesium dichloride or a dialkyl magnesium of the formula $R_2Mg$, wherein each one of the two Rs is a similar or different $C_1$-$C_{20}$ alkyl, preferably a similar or different $C_2$-$C_{10}$ alkyl. Typical magnesium alkyls are ethylbutyl magnesium, dibutyl magnesium, dipropyl magnesium, propylbutyl magnesium, dipentyl magnesium, butylpentyl magnesium, butyloctyl magnesium and dioctyl magnesium. Most preferably, one R of the formula $R_2Mg$ is a butyl group and the other R is an octyl or ethyl group, i.e. the dialkyl magnesium compound is butyl octyl magnesium or butyl ethyl magnesium.

Typical alkyl-alkoxy magnesium compounds RMgOR, when used, are ethyl magnesium butoxide, butyl magnesium pentoxide, octyl magnesium butoxide and octyl magnesium octoxide.

Dialkyl magnesium, alkyl magnesium alkoxide or magnesium dihalide can react, in addition to the alcohol containing in addition to the hydroxyl group at least one further oxygen bearing moiety being different to a hydroxyl moiety, which is defined above in this application, with a monohydric alcohol R'OH, or a mixture thereof with a polyhydric alcohol R'(OH)$_m$ Preferred monohydric alcohols are alcohols of the formula $R^b$(OH), wherein $R^b$ is a $C_1$-$C_{20}$, preferably a $C_4$-$C_{12}$, and most preferably a $C_6$-$C_{10}$, straight-chain or branched alkyl residue or a $C_6$-$C_{12}$ aryl residue. Preferred monohydric alcohols include methanol, ethanol, n-propanol, iso-propanol, n-butanol, iso-butanol, sec-butanol, tert-butanol, n-amyl alcohol, iso-amyl alcohol, sec-amyl alcohol, tert-amyl alcohol, diethyl carbinol, sec-isoamyl alcohol, tert-butyl carbinol, 1-hexanol, 2-ethyl-1-butanol, 4-methyl-2-pentanol, 1-heptanol, 2-heptanol, 4-heptanol, 2,4-dimethyl-3-pentanol, 1-octanol, 2-octanol, 2-ethyl-1-hexanol, 1-nonanol, 5-nonanol, diisobutyl carbinol, 1-decanol and 2,7-dimethyl-2-octanol, 1-undecanol, 1-dodecanol, 1-tridecanol, 1-tetradecanol, 1-pentadecanol, 1-hexadecanol, 1-heptadecanol 1-octadecanol and phenol or benzyl alcohol. The aliphatic monohydric alcohols may optionally be unsaturated, as long as they do not act as catalyst poisons. The most preferred monohydric alcohol is 2-ethyl-1-hexanol.

Preferred polyhydric alcohols are alcohols of the formula $R^b$(OH)$_m$, wherein $R^a$ is a straight-chain, cyclic or branched $C_2$ to $C_6$ hydrocarbon residue, (OH) denotes hydroxyl moieties of the hydrocarbon residue and m is an integer of 2 to 6, preferably 3 to 5. Especially preferred polyhydric alcohols include ethylene glycol, propylene glycol, trimethylene glycol, 1,2-butylene glycol, 1,3-butylene glycol, 1,4-butylene glycol, 2,3-butylene glycol, 1,5-pentanediol, 1,6-hexanediol, 1,8-octanediol, pinacol, diethylene glycol, triethylene glycol, 1,2-catechol, 1,3-catechol and 1,4-catechol, and triols such as glycerol and pentaerythritol. The polyhydric alcohol can be selected on the basis of the activity and morphology it gives to the catalyst component.

The compound of a four-valent Group 4 metal compound containing a halogen is preferably a titanium tetrahalide. Equivalent to titanium tetrahalide is the combination of an alkoxy titanium halide and a halogenation agent therefore, which are able to form a titanium tetrahalide in situ. The most preferred halide is the chloride, for zirconium and hafnium as well as for titanium.

The reaction conditions used in the claimed process may be varied according to the used reactants and agents.

Though the catalyst component preparation according to the inventive method can be carried out batchwise, it is also possible to prepare the catalyst component semi-continuously or continuously. In such semi-continuous or continuous process, the solution of the complex of the group 2 metal and said electron donor or the donor free Group 2 metal solution, are mixed with at least one compound of a transition metal, which might be dissolved in the same or different organic liquid reaction medium. The so obtained solution is then agitated, possibly in the presence of an emulsion stabilizer other additives or further solvents added in order to produce/ stabilize the emulsion, and then the so-agitated emulsion is fed into a temperature gradient reactor, in which the emulsion is subjected a temperature gradient, thus leading to solidifying the droplets of a dispersed phase of the emulsion.

The solidified particles of the olefin polymerisation catalyst component can subsequently be recovered by an in-stream filtering unit and then, optionally after some additional washing and drying steps in order to remove unreacted starting components, can be stored for further use. In one embodiment the catalyst can be fed after washing steps into the olefin polymerisation reactor, so that a continuous preparation and feed to the reactor is guaranteed. It is also possible to mix the solidified and washed catalyst component with an oily fluidic liquid and store and use the catalyst component as a catalyst component-oil slurry. In this way the drying steps can be avoided, which might be sometimes detrimental to the catalyst components morphology. This oil-slurry method is described in general in EP1489110 of the applicant, incorporated herein by reference.

As mentioned before, a filtering unit might preferably be used for filtering the solidified particles from the solvent stream. For said filtering unit, various drums and sieving systems can be used, depending on the specific particle sizes.

The following examples illustrate aspects of the present invention.

In the examples the following measuring methods were used:

Melt Flow Rate, MFR: ISO 1133; 230° C., 2.16 kg load
Bulk density, BD, is measured according ASTM D 1895
Particle Size Distribution, PSD
Coulter Counter LS 200 at room temperature with heptane as medium.
ICP Analysis (Al, Mg, Ti)

The elemental analysis of the catalysts was performed by taking a solid sample of mass, M, cooling over dry ice. Samples were diluted up to a known volume, Vol, by dissolving in nitric acid (65% $HNO_3$, 5% of Vol) and freshly deionised (DI) water (95% of Vol), the samples were left to stabilise for two hours.

The analysis was run at room temperature using a Thermo Elemental IRIS Advantage XUV Inductively Coupled Plasma—Atomic Excitation Spectrometer (ICP-AES) which was calibrated immediately before analysis using a blank (a solution of 5% $HNO_3$ in DI water), a low standard (10 ppm Al in a solution of 5% $HNO_3$ in DI water, a high standard (100 ppm Mg, 50 ppm Al, 50 ppm Ti and 50 ppm V in a solution of 5% $HNO_3$ in DI water) and a quality control sample (50 ppm Mg, 20 ppm Al, 20 ppm Ti and 20 ppm V in a solution of 5% $HNO_3$ in DI water).

The content of aluminium was monitored via the 167.081 nm line, when Al concentration in ICP sample was between 0-10 ppm and via the 396.152 nm line for Al concentrations between 10-100 ppm. The magnesium concentration was monitored via the 285.213 nm line and the titanium content via the 323.452 nm line.

The content of vanadium was monitored using an average from the 292.402 nm and 310.230 nm lines.

The reported values, required to be between 0 and 100, or further dilution is required, are an average of three successive aliquots taken from the same sample and are related back to the original catalyst using equation 1.

$$C = (R \times Vol)/M \qquad \text{Equation 1}$$

Where: C is the concentration in ppm, related to % content by a factor of 10,000
R is the reported value from the ICP-AES
Vol is the total volume of dilution in ml
M is the original mass of sample in g If dilution was required then this also needs to be taken into account by multiplication of C by the dilution factor.

Xylene solubles, XS: Xylene soluble fraction of product at 25° C.

2.0 g of polymer are dissolved in 250 ml p-xylene at 135° C. under agitation. After 30±2 minutes the solution is allowed to cool for 15 minutes at ambient temperature and then allowed to settle for 30 minutes at 25±0.5° C. The solution is filtered with filter paper into two 100 ml flasks.

The solution from the first 100 ml vessel is evaporated in nitrogen flow and the residue is dried under vacuum at 90° C. until constant weight is reached.

$$XS\% = (100 \times m_1 \times v_0)/(m_0 \times v_1)$$

$m_0$ = initial polymer amount (g)
$m_1$ = weight of residue (g)
$v_0$ = initial volume (ml)
$v_1$ = volume of analyzed sample (ml)

All reactions in the examples as described below are carried out under inert conditions. The preferred examples follow the general procedure as described below with slight modifications thereof.

$TiCl_4$ is added to a reactor under $N_2$ atmosphere and cooled to 0° C. A solution of mixed magnesium complexes is added slowly with constant stirring. To the resulting mixture the electron donor is added and stirring is continued, for example for 15 min. Then, optionally heptane is added to enhance the formation of two phases, followed by the addition of a polydecene solution in toluene and an emulsion stabilizer Viscoplex®1-254 of Evonik (a solution of polyalkyl methacrylate in neutral oil). Stirring at 0° C. is continued for 30 min. Then the resulting emulsion is heated up to 90° C. during 15 min to solidify the droplets. Stirring at 90° C. is continued for 30 min. At this point the solid particles may be allowed to settle and the supernatant is siphoned off. Toluene is added and the mixture is stirred for 30 min. After settling the supernatant is again siphoned off. The second washing is conducted similarly, except that heptane is used instead of toluene and stirring time is 20 min. Third washing may be conducted using pentane at room temperature for 10 min. Pentane is subsequently siphoned off and the resulting solid catalyst powder is dried for 20 min at 60° C. with $N_2$ purge.

Some preferred embodiments of the invention are described, by way of illustration, in the following examples.

EXAMPLE 1

Preparation of Mg Complex Mixture 1

A magnesium complex solution was prepared by adding, with stirring, first 81 ml of a 20% solution in toluene of BOMAG-A ($Mg(Bu)_{1.5}(Oct)_{0.5}$), provided by Crompton, followed by 81 ml of a 20% solution of BOMAG-A in heptane, provided by Albemarle, to a mixture of 35.0 ml 2-ethylhexanol and 22.1 ml 2-(2-ethylhexyloxy)ethanol in a 300 ml glass reactor. During the addition the reactor contents were maintained below 30° C. The resulting mixture was stirred at room temperature for 30 min. The temperature of the reaction mixture was then raised to 60° C. and held at that level for 1 h with stirring, at which time reaction was complete. After cooling to room temperature a clear to slightly yellow solution was obtained.

EXAMPLE 2

Preparation of Mg Complex Mixture 2

A magnesium complex solution was prepared by adding, with stirring, first 81 ml of a 20% solution in toluene of BOMAG $(Mg(Bu)_{1.5}(Oct)_{0.5})$ followed by 81 ml of a 20% solution of BOMAG in heptane to a mixture of 39.4 ml 2-ethylhexanol and 16.6 ml 2-(2-ethylhexyloxy)ethanol in a 300 ml glass reactor. During the addition the reactor contents were maintained below 30° C. The resulting mixture was stirred at room temperature for 30 min. The temperature of the reaction mixture was then raised to 60° C. and held at that level for 1 h with stirring, at which time reaction was complete. After cooling to room temperature a clear to slightly yellow solution was obtained.

EXAMPLE 3

Preparation of Mg Complex Mixture 3

A magnesium compound solution was prepared by adding, with stirring, 100 ml of a 20% solution in toluene of BOMAG $(Mg(Bu)_{1.5}(Oct)_{0.5})$ to a mixture of 17.5 ml 2-ethylhexanol and 14.7 ml 2-butoxyethanol in a 300 ml glass reactor. During the addition the reactor contents were maintained below 30° C. The resulting mixture was stirred at room temperature for 30 min. The temperature of the reaction mixture was then raised to 60° C. and held at that level for 1 h with stirring, at which time reaction was complete. After cooling to room temperature a clear to slightly yellow solution was obtained.

EXAMPLE 4

Preparation of Catalyst Component 1

25.6 ml titanium tetrachloride was placed in a 300 ml glass reactor equipped with a mechanical stirrer. Mixing speed was adjusted to 220 rpm. 34.2 ml of the Mg complex mixture 1 prepared in example 1 was then added to the stirred reaction mixture over a 10 minute period. During the addition of the Mg complex mixture the reactor contents were maintained below 10° C. After the addition of the Mg complex mixture the cooling bath was removed and 3.55 g of bis-(2-ethylhexyl)citraconate, prepared as described in example 4a, was added. The resulting mixture was stirred at room temperature for 15 min. Then 18 ml of heptane was added.

1.0 ml of a solution in toluene of 3.0 mg polydecene and 4.0 ml Viscoplex®1-254 were then added. The resulting emulsion was stirred (220 rpm) at room temperature for 30 min. Solidification of the droplets of dispersed phase of the emulsion was done by raising the temperature of the reaction mixture slowly to 90° C. over a period of 15 minutes and held at that level for 30 minutes with stirring. After that the stirring was stopped and the solid particles were allowed to settle. The Supernatant liquid was siphoned off.

After settling and siphoning the solids underwent washing with 100 ml toluene at 90° C. for 30 minutes, 60 ml heptane for 20 minutes at 90° C. and 60 ml pentane for 10 minutes at 25° C. Finally, the solids were dried at 60° C. by nitrogen purge, to yield a yellow, air-sensitive powder.

EXAMPLE 4a

Preparation of bis-(2-ethylhexyl)citraconate 10 ml of citraconic anhydride (CAS no 616-02-4) and 53 ml of 2-ethyl-hexanol (CAS no 104-76-7) and 0.3 g of p-toluenesulfonic acid monohydride (CAS n 6192-52-5) were mixed in a glass flask at room temperature. The mixture was heated to 160° C., and maintained at that temperature under stirring overnight. Thereafter the mixture was cooled and diluted with 50 ml of ethylacetate, and washed twice with 100 ml of 10% $NaHCO_3$ solution and twice with 50 ml of water, and dried with $MgSO_4$, and filtered. Final purification of citraconate was done by vacuum distillation.

EXAMPLE 5

Preparation of Catalyst Component 2

The preparation of the catalyst component 2 was done as described in example 4 except 19.5 ml titanium tetrachloride was used.

EXAMPLE 6

Preparation of Catalyst Component 3

The preparation of the catalyst component 3 was done as described in example 5 except 0.11 ml of diethylaluminum chloride (DEAC) was added to the washing toluene.

EXAMPLE 7

Preparation of Catalyst Component 4

The preparation of the catalyst component 4 was done as described in example 6 except one additional washing with 100 ml of toluene at 90° C. for 30 min was performed before DEAC-toluene wash.

EXAMPLE 8

Preparation of Catalyst Component 5

The preparation of the catalyst component 5 was done as described in example 7 except that the slow (30 min) addition of the Mg complex mixture to the titanium tetrachloride and the emulsion stirring were performed under 10° C.

EXAMPLE 9

Preparation of Catalyst Component 6

The preparation of the catalyst component 6 was done as described in example 8 except that temperature was kept below −5° C. until the reaction mixture was heated to 90° C. and stirring speed was 300 rpm.

EXAMPLE 10

Preparation of Catalyst Component 7

The preparation of the catalyst component 7 was done as described in example 9 except that only one toluene washing without DEAC was performed.

EXAMPLE 11

Preparation of Catalyst Component 8

The preparation of the catalyst component 8 was done as described in example 10 except that a glass reactor with steel baffles was used.

EXAMPLE 12

Preparation of Catalyst Component 9

The preparation of the catalyst component 9 was done as described in example 11 except that an additional washing with 100 ml of 25% (vol/vol) titanium tetrachloride-toluene mixture before the toluene washing was performed.

EXAMPLE 13

Preparation of Catalyst Component 10

The preparation of the catalyst component 10 was performed as described in example 11 except that the emulsion was heated to 90° C. slowly (85 min) and three additional washings were performed before the toluene washing: first 100 ml toluene at 90° C. for 10 min, second 100 ml toluene containing 0.11 ml DEAC at 90° C. for 30 min and third with 100 ml of 25% (vol/vol) titanium tetrachloride-toluene containing 2 ml bis-(2-ethylhexyl)citraconate. In FIG. 1 there is a SEM picture of the catalyst particles.

EXAMPLE 14

Preparation of Catalyst Component 11

The preparation of the catalyst component 11 was performed as described in example 10 except that 35.2 ml of Mg complex mixture 2 described in example 2 was used.

EXAMPLE 15

Preparation of Catalyst Component 12

14.4 ml titanium tetrachloride and 15 ml toluene were placed in a 300 ml glass reactor equipped with a mechanical stirrer. Mixing speed was adjusted to 170 rpm. A mixture of 23.1 ml of the Mg complex mixture 3 prepared in example 3 and 2.1 ml of diisobutyl cyclohexene-1,2-dicarboxylate was then added to the stirred reaction mixture over a 10 minute period. During the addition of the Mg compound the reactor contents were maintained below 10° C.

0.74 ml of a solution in toluene of 2.2 mg polydecene and 1.5 ml Viscoplex 1-254 were then added. The resulting emulsion was stirred (170 rpm) at room temperature for 5 min before addition of 6 ml heptane. The resulting mixture was stirred at room temperature for 30 min. The temperature of the reaction mixture was then slowly raised to 90° C. over a period of 15 minutes and held at that level for 30 minutes with stirring. After that the stirring was stopped and the solid particles were allowed to settle. The supernatant liquid was siphoned off. After settling and siphoning the solids underwent washing with 100 ml toluene at 90° C. for 30 minutes, 60 ml heptane for 20 minutes at 90° C. and 60 ml pentane for 10 minutes at 25° C. Finally, the solids were dried at 60° C. by nitrogen purge, to yield a yellow, air-sensitive powder.

TABLE 1

Catalyst compositions.

| Catalyst component | Ti (w-%) | Mg (w-%) | Donor (w-%) | Mean particle size (μm) |
|---|---|---|---|---|
| 1 | 3.59 | 14.9 | 24.5 | nd |
| 2 | 3.32 | 13.3 | 21.1 | 55 |
| 3 | 6.06 | 12.0 | 21.4 | 46 |
| 4 | 4.41 | 14.3 | 10.9 | 59 |
| 5 | 5.49 | 12.9 | 8.6 | 47 |
| 6 | 4.58 | 12.4 | 9.5 | 48 |
| 7 | 3.27 | 13.4 | 28.0 | 43 |
| 8 | 3.64 | 13.0 | Nd | 48 |
| 9 | 3.29 | 14.9 | 25.5 | 45 |
| 10 | 4.20 | 12.7 | 16.3 | 56 |
| 11 | 3.83 | 14.9 | 24.0 | 50 |
| 12 | 4.15 | 15.6 | Nd | nd | nd = not determined

Polymerisations

All raw materials were essentially free from water and air and all material additions to the reactor and the different steps were done under inert conditions in nitrogen atmosphere. The water content in propene was less than 5 ppm.

The polymerisation was done in a 5 litre reactor, which was heated, vacuumed and purged with nitrogen before taken into use. An amount of TEA (triethylaluminum, from Witco used as received), donor (cyclohexyl methyl dimethoxysilane, from Wacker, dried with molecular sieves) and 30 ml pentane (dried with molecular sieves and purged with nitrogen) were mixed and allowed to react for 5 minutes. Half of the mixture was added to the reactor and the other half was mixed with about 20 mg of the phthalate free catalyst component. After about 10 minutes the catalyst component/TEA/Donor/pentane mixture was added to the reactor. The amounts of TEA and donor were such that Al/Ti molar ratio 250 and Al/Do molar ratio 10 was achieved. 70 mmol hydrogen and 1400 g propene were added to the reactor. The temperature was increased from room temperature to 70° C. (or 80° C.) during about 20 minutes. After 1 h at the desired temperature the reaction was stopped by flashing out unreacted monomer. Finally the polymer powder was taken out from the reactor and analysed and tested.

TABLE 2

Results of Polymerisations

| Catalyst component | Activity (kg PP/g cat) hour | MFR$_{2.16}$ (g/10 min) | XS (w-%) |
|---|---|---|---|
| 1 | 17.5 | 10.7 | 3.0 |
| 2 | 11.4 | 12.7 | 3.4 |
| 3 | 9.6 | 22 | 6.3 |
| 4 | 17.4 | 15.4 | 5.0 |
| 5 | 16.6 | 12.2 | 6.9 |
| 5[a] | 21.7 | 15.1 | 5.4 |
| 6 | 21.7 | 11.6 | 5.2 |
| 7 | 20.0 | 8.7 | 2.7 |
| 7 | 21.2 | 9.5 | 2.0 |
| 8 | 14.2 | 10.3 | 3.2 |
| 9 | 15.1 | nd | nd |
| 10 | 14.0 | 18.4 | 7.6 |
| 10[a] | 17.1 | 19.3 | 6.1 |
| 11 | 15.0 | 10.8 | 3.2 |
| 12 | 18.7 | 5.6 | 2.2 |

[a]Polymerisation at 80° C.
nd = not determined

EXAMPLE 16

Preparation of Mg-Complex (Complex A)

A magnesium complex solution was prepared by adding, with stirring, 227.6 ml of butyloctylmagnesium (BOMAG A, a 20 w-% solution in toluene) to 74.0 ml butoxypropanol (1,3-propylene glycol monobutyl ether). During the addition the reactor temperature was maintained about 25° C. After addition the reaction mixture was stirred for 60 minutes at 60° C. Solution was cooled to room temperature and stored.

Preparation of Mg-Complex (Complex B)

A magnesium complex solution was prepared by adding, with stirring, 55.8 kg of a 20% solution in toluene of BOMAG-A $(Mg(Bu)_{1.5}(Oct)_{0.5})$, provided by Crompton GmbH, to 19.4 kg 2-ethylhexanol in a 150 l steel reactor. During the addition the reactor contents were maintained below 20° C. The temperature of the reaction mixture was then raised to 60° C. and held at that level for 30 minutes with stirring, at which time reaction was complete. After cooling to room temperature a yellow solution was obtained.

Preparation of the Catalyst Component 13

19.5 ml titanium tetrachloride was placed in a 300 ml glass reactor equipped with a mechanical stirrer. Mixing speed was adjusted to 170 rpm.

Then 10 ml of the prepared Mg-alkoxide (Complex A) was mixed with 20 ml of prepared magnesium 2-ethylhexoxide (Complex B) and with 3.0 ml of bis-(2-ethylhexyl)citraconate as donor and this mixture was added slowly to $TiCl_4$. During the addition temperature was kept about 25° C. Then 1 ml of Viscoplex® 1-254 and 22 ml of heptane was added and the emulsion was formed, followed by solidification of the droplets of the emulsion by raising the temperature of the emulsion to 90° C. over a period of 24 minutes and held at that level for 30 minutes with stirring.

After settling and siphoning 100 ml of toluene containing 0.11 ml of diethylaluminiumchloride was added to the reactor. After 30 minutes mixing solids were settled and liquid was siphonated. Solids were washed first with 100 ml of toluene (90°, 30 min), then with 100 ml heptane for 20 minutes at 90° C. and with 60 ml pentane for 10 minutes at 25° C. Finally, the catalyst was dried at 60° C. by nitrogen purge.

The catalyst composition: Ti 3.6%, Mg 10.2%, donor 20.4% bis-(2-ethylhexyl)citraconate Polymerisation was carried out as for catalyst components 1-12 using the catalyst prepared in this example 16. Activity: 13.1 kgPP/gCat h, MFR: 15.2 and XS 5.8

Example 17

Preparation of the Catalyst Component 14

19.5 ml titanium tetrachloride were placed in a 300 ml glass reactor equipped with a mechanical stirrer. Mixing speed was adjusted to 170 rpm.

Then 10 ml of the Mg Complex A as prepared in example 16 was mixed with 20 ml of magnesium 2-ethylhexoxide (Complex B) as prepared in example 16 and with 3.0 ml of bis-(2-ethylhexyl)citraconate, and this mixture was added slowly to $TiCl_4$. During the addition temperature was kept about 25° C. Then, 1 ml of Viscoplex 1-254® and 22 ml of heptane were added and the emulsion was formed. Solidification of the droplets of the dispersed phase was done by raising the temperature of the emulsion to 90° C. over a period of 26 minutes and held at that level for 30 minutes with stirring.

After settling and siphoning 100 ml of toluene containing 0.75 ml of 10 w-% diethylaluminiumethoxide (DEALOX) in pentane was added to the reactor. After 30 minutes mixing (at 90° C.) solids were settled and liquid was siphonated. Then the solids were washed with 30 ml of $TiCl_4$ at 90° C. for 20 min. After settling syphoning washing was continued as example 16 using toluene, heptane and pentane. Finally catalyst was dried at 60° C. by nitrogen flow.

The catalyst composition: Ti 4.2%, Mg 13.4%, donor 23.9% bis-(2-ethylhexyl)citraconate Polymerisation was done as in the previous examples. Activity: 28.0 kgPP/gCat h; MFR: 11.2 and XS 4.8

EXAMPLE 18

As Mg-complex (Complex A) solution was used the same complex solution as in example 16.

Preparation of Mg-complex (Complex B)

A magnesium alkoxide solution was prepared by adding, with stirring, 80,0 ml of butyloctylmagnesium (BOMAG A, a 20 w % solution in toluene) to 28,0 ml 2-ethyl hexanol. During the addition the reactor temperature was maintained about 25° C. Then 3,8 ml benzoyl Solution was cooled to room temperature and stored Preparation of the Catalyst Component 15

19.5 ml titanium tetrachloride were placed in a 300 ml glass reactor equipped with a mechanical stirrer. Mixing speed was adjusted to 170 rpm.

Then 4.5 ml of the Mg complex (Complex A) was mixed with 32 ml of Mg-complex (Complex B) and this mixture was added slowly to $TiCl_4$. During the addition temperature was kept about at 25° C. Then 1.3 ml of Viscoplex 1-254® and 10 ml of heptane was added followed by solidification of the droplets of the formed emulsion by raising the temperature of the emulsion to 90° C. over a period of 27 minutes and held at that level for 30 minutes with stirring.

After settling and siphoning 100 ml of toluene containing 0.11 ml of diethylaluminiumchloride (DEAC) was added to the reactor. After 30 minutes mixing (at 90° C.) solids were settled and liquid was siphonated. Then the solids were washed with, heptane (90° C., 30 min) and pentane (25° C., 20 min). Finally catalyst was dried at 60° C. by nitrogen flow.

The catalyst composition: Ti 5.4%, Mg 11.8%.

Polymerisation was repeated as in the previous examples using the catalyst component 15. Activity: 23.1 kgPP/gCat h, MFR: 15.0 and XS 2.8

COMPARATIVE EXAMPLE 1

Catalyst Preparation 2.0 ml of diethyl phthalate/DEP) and a solution of 44 ml of Mg Complex B as prepared in example 16 were mixed together and added to 19.5 ml of $TiCl_4$ within 15 minutes at a temperature of below 15° C. under stirring (170 rpm). During addition of Mg complex to $TiCl_4$ a gelly material was formed. Addition of heptane did not change the gelly material into emulsion format. Thus no solid catalyst particles could be made by adding a donor as such, when only complex B type Mg complex was used.

COMPARATIVE EXAMPLE 2

Procedure of comparative example 1 was repeated, however using 30 ml of Mg Complex B and as donor 3.0 ml of bis-(2-ethylhexyl)citraconate. Again, no emulsion was formed, but a gelly material, from which no solid catalyst particles were formed.

We claim:

1. Process for preparing a particulate olefin polymerisation catalyst component said process comprising the steps of:
   a) providing a solution of at least one Complex A being a complex of a Group 2 metal compound and a monohydric alcohol comprising in addition to the hydroxyl moiety at least one further oxygen bearing moiety being different to a hydroxyl moiety optionally in an organic liquid reaction medium;
   b) adding said solution to at least one compound of a transition metal and producing an emulsion the dispersed phase of which contains more than 50-mol % of the Group 2 metal;
   c) agitating the emulsion in order to maintain the droplets of said dispersed phase preferably within an average size range of 5 to 200 µm;
   d) solidifying said droplets of the dispersed phase;
   e) recovering the solidified particles of the olefin polymerization catalyst component,
   and wherein an electron donor is added at any step prior to step c) and said electron donor is non-phthalic acid ester.

2. The process of claim 1, wherein the step of providing a solution of at least one Complex A further includes providing a solution of at least one Complex B being a complex of a Group 2 metal compound and an alcohol not comprising any other oxygen bearing moiety being different to a hydroxyl moiety optionally in an organic liquid reaction medium so as to obtain a solution of a mixture of said at least one Complex A and said at least one Complex B; and optionally adding a donor into the solution of complex mixture.

3. The process of claim 1, further comprising washing said solidified particles prior to recovering in step e).

4. A process according to claim 1, wherein the electron donor is selected from diesters of non-phthalic carboxylic diacids and esters of carboxylic monoacids and derivatives and mixtures thereof.

5. A process according to claim 4, wherein ester moieties of the diesters of non-phthalic carboxylic diacids and esters of carboxylic monoacids may be identical or different, and are linear or branched aliphatic groups having from 1 to 20 carbon atoms, or aromatic groups having 6 to 12 carbon atoms, optionally containing heteroatoms of Groups 14 to 17 of the Periodic Table of IUPAC, and an acid moiety of the diesters of non-phthalic dicarboxylic acids and esters of carboxylic monoacids comprises 1 to 30 carbon atoms, optionally being substituted by aromatic or saturated or non-saturated cyclic or aliphatic hydrocarbyls having 1 to 20 C, and optionally containing heteroatoms of Groups 14 to 17 of the Periodic Table of IUPAC.

6. A process according to claim 1, wherein the non-phthalic diacid ester is a diester of a non-phthalic carboxylic diacid.

7. A process according to claim 1, wherein the monohydric alcohol comprising in addition to the hydroxyl moiety at least one further oxygen bearing moiety being different to a hydroxyl moiety is an alcohol bearing an ether group.

8. A process according to claim 1, wherein the Complex A of Group 2 metal is prepared by reacting a compound of Group 2 metal with the monohydric alcohol comprising in addition to the hydroxyl moiety at least one further oxygen bearing moiety being different to a hydroxyl moiety in an organic liquid medium.

9. A process according to claim 2, wherein the complex B of Group 2 metal is prepared by reacting a compound of Group 2 metal with the alcohol not comprising in addition to the hydroxyl moiety at least one further oxygen bearing moiety being different to a hydroxyl moiety in an organic liquid medium.

10. A process according to claim 2 wherein the molar ratio of complexes A and B in the solution is from 10:1 to 1:10.

11. A process according to claim 1, wherein said Group 2 metal is magnesium.

12. A process according to claim 1, wherein said transition metal is a Group 4 metal and/or Group 5 metal.

13. Particles of the catalyst component obtained according to the process of claim 1.

14. An olefin polymerization catalyst comprising particles of a catalyst component and a co-catalyst, said component obtained by a process comprising the steps of:
   a) providing a solution of at least one Complex A being a complex of a Group 2 metal compound and a monohydric alcohol comprising in addition to the hydroxyl moiety at least one further oxygen bearing moiety being different to a hydroxyl moiety optionally in an organic liquid reaction medium;
   b) adding said solution to at least one compound of a transition metal and producing an emulsion the dispersed phase of which contains more than 50-mol % of the Group 2 metal;
   c) agitating the emulsion in order to maintain the droplets of said dispersed phase preferably within an average size range of 5 to 200 µm;
   d) solidifying said droplets of the dispersed phase;
   e) recovering the solidified particles of the olefin polymerization catalyst component,
   and wherein an electron donor is added at any step prior to step c) and said electron donor is non-phthalic acid ester.

15. An olefin polymerization catalyst according to claim 14, for polymerizing olefins, optionally with co-monomers, selected from $C_2$ to $C_{12}$ monomers.

16. A process according to claim 4, wherein ester moieties of the diesters of non-phthalic carboxylic diacids and esters of carboxylic monoacids may be identical or different, and are linear or branched aliphatic groups having from 2 to 12 carbon atoms, or aromatic groups having 6 to 12 carbon atoms, optionally containing heteroatoms N, O, S and/or P, and an acid moiety of the diesters of non-phthalic dicarboxylic acids and esters of carboxylic monoacids comprises 2 to 16 carbon atoms, optionally being substituted by aromatic or saturated or non-saturated cyclic or aliphatic hydrocarbyls having 1 to 10 carbon atoms and optionally containing heteroatoms of N, O, S and/or P.

17. A process according to claim 4, wherein ester moieties of the diesters of non-phthalic carboxylic diacids and esters of carboxylic monoacids may be identical or different, and are linear or branched aliphatic groups having from 2 to 16 carbon atoms, or aromatic groups having 6 to 12 carbon atoms, optionally containing heteroatoms of the Periodic Table of IUPAC, and an acid moiety of the diesters of non-phthalic dicarboxylic acids and esters of carboxylic monoacids comprises 2 to 20 carbon atoms, optionally being substituted by aromatic or saturated or non-saturated cyclic or aliphatic hydrocarbyls having 1 to 20 carbon atoms and optionally containing heteroatoms of Groups 14 to 17 of the Periodic Table of IUPAC.

18. A process according to claim 1, wherein said transition metal is Ti.

19. An olefin polymerization catalyst according to claim 14, wherein said co-catalyst is an alkyl or alkoxy aluminum co-catalyst and optionally an external electron donor.

20. An olefin polymerization catalyst according to claim 14, used for polymerizing $C_2$ to $C_{10}$ α-olefins, optionally with co-monomers, selected from $C_2$ to $C_{12}$ monomers.

* * * * *